Nov. 3, 1931.  J. B. STRAUSS  1,830,007
AIRPLANE
Filed June 3, 1929
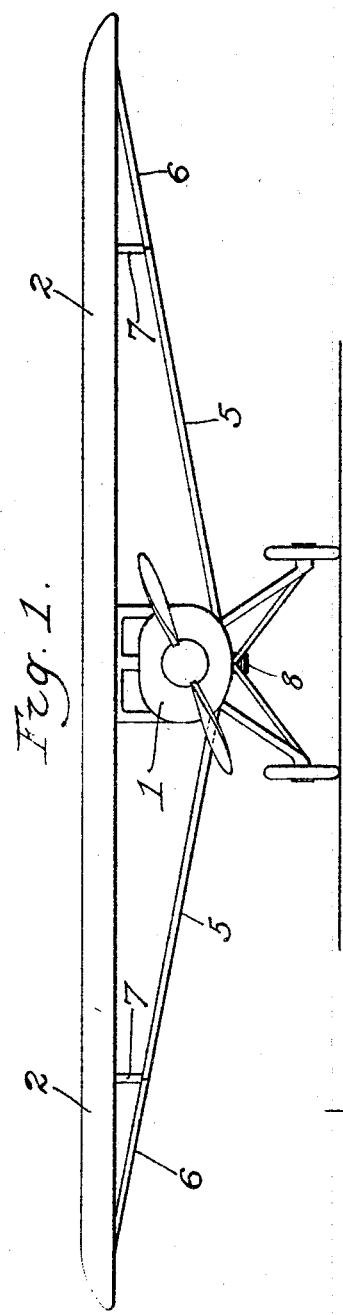
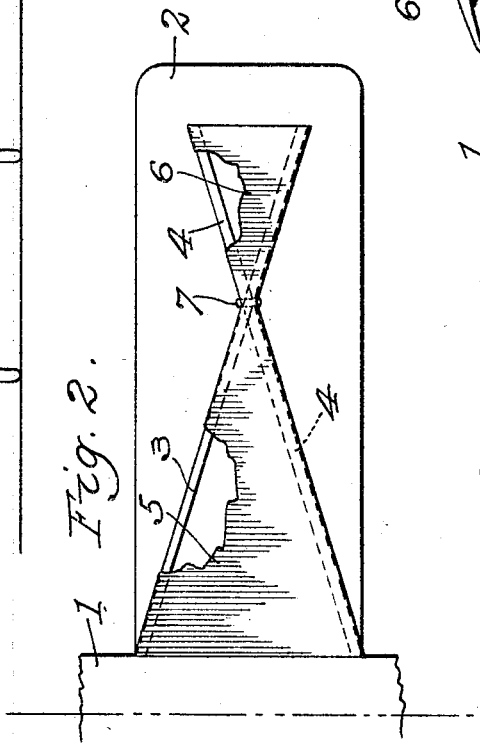
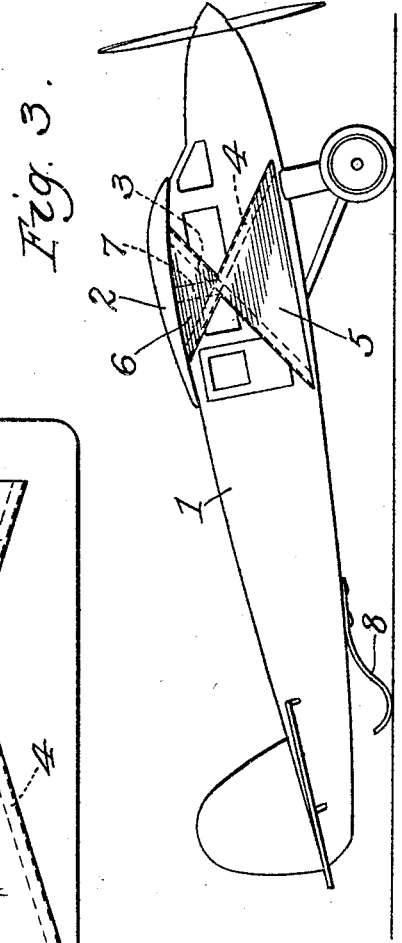
Inventor
Joseph B. Strauss
by Parker Carter
Attorneys.

Patented Nov. 3, 1931

1,830,007

UNITED STATES PATENT OFFICE

JOSEPH B. STRAUSS, OF CHICAGO, ILLINOIS

AIRPLANE

Application filed June 3, 1929. Serial No. 367,980.

This invention relates to airplanes and has for its object to provide a new and improved device of this description.

The invention has as a further object to provide an airplane which can be constructed at low cost and which shall have great strength and durability and which shall be reliable in action.

The invention has other objects which are more particularly pointed out in the accompanying description.

Referring now to the drawings, Fig. 1 is a view of one form of airplane embodying the invention.

Fig. 2 is a view of one of the wings as seen from beneath.

Fig. 3 is a side view of the device.

Like numerals refer to like parts throughout the several figures.

Referring now to the drawings, I have illustrated an airplane consisting of a body 1 and the wings 2. Associated with each wing are two inclined members 3 and 4 which cross each other. One end of each of said members is connected with the body 1 and the other end of each of said members is connected with the associated wing 2. The members 3 and 4, therefore, form as it were, two triangles with a common apex, the base of one of which is connected with the body of the airplane and the base of the other being connected with the wing of the airplane. The point at which the members cross is connected to the wing by a strut 7.

The space in one or both of the triangles may be filled in so as to form a wing section such wing sections fitting in between the members. As herein shown I have illustrated both spaces as being thus filled in with the wing sections 5 and 6, (see Fig. 2). The front end of the body is provided with the usual landing apparatus such as landing wheels. I have also shown the rear end of the body 1 as being provided with an additional landing device consisting of the spring ground engaging member 8 which may be of any suitable form and I have shown a simple form to illustrate the construction. This spring member engages the ground when the airplane alights and slides along the ground giving a spring action which breaks the shock. This also gives an elastic or spring support for the rear end of the body at the time it is landed.

It will thus be seen that I have here a construction where the wings are provided with inclined supporting strut members arranged in the form of two triangles, the point where the members cross being also connected to the wing by a strut.

It will further be seen that this produces a strong, durable construction which can be made at a low cost and which is durable and reliable when in use.

I claim:—

1. An airplane comprising a body portion, a wing, two inclined members connected with said body portion, the outer ends of said inclined member being connected with said wing near its outer end, said inclined members crossing each other at a point between their ends and the body portion so as to form two triangles one having its base connected with the body portion and the other having its base connected with the wing.

2. An airplane comprising a horizontal wing, two inclined struts at an angle to said wing and joining it near its outer end, said struts crossing each other at a point intermediate their ends and connected together at their junction point to form a bracing member comprising two triangles with a common apex and a connection between said wing and the junction point of said struts.

3. An airplane comprising a horizontal wing, two inclined struts at an angle to said wing and joining it near its outer end, said struts crossing each other at a point intermediate their ends and connected together at their junction point to form a bracing member comprising two triangles with a common apex, and a wing section contained in one of said triangles.

4. An airplane comprising a horizontal wing, two inclined struts at an angle to said wing and joining it near its outer end, said struts crossing each other at a point intermediate their ends and connected together at their junction point to form a bracing member comprising two triangles with a common apex, and a wing section contained in one of said triangles and fitting in between the inclined struts.

5. An airplane comprising a horizontal wing, two inclined struts at an angle to said wing and joining it near its outer end, said struts crossing each other at a point intermediate their ends and connected together at their junction point to form a bracing member comprising two triangles with a common apex, and a wing section contained in one of said triangles and fitting in between the inclined struts, and a rigid member connecting the wing with the junction point of said struts.

6. An airplane comprising a body portion a horizontal wing, two inclined struts at an angle to said wing and joining it near its outer end, said struts crossing each other at a point intermediate their ends and connected together at their junction point to form a bracing member comprising two triangles with a common apex, and a wing section contained in both of said triangles and filling the space in between the inclined struts; said struts connected at their inner ends to said body portion.

Signed at Chicago, county of Cook and State of Illinois, this 25th day of May, 1929.

JOSEPH B. STRAUSS.